(12) United States Patent
da Fonseca et al.

(10) Patent No.: US 9,515,705 B2
(45) Date of Patent: Dec. 6, 2016

(54) NEAR FIELD RF COMMUNICATOR AND TIMING APPARATUS (71) Applicant: Broadcom Corporation, Irvine, CA (US)

(72) Inventors: Humberto Andrade da Fonseca, Cirencester (GB); Lance Rhys Trodd, Swindon (GB); Robin Wyndham John Wilson, Cirencester (GB); David John Miles, Cirencester (GB)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/992,710

(22) Filed: Jan. 11, 2016

(65) Prior Publication Data
US 2016/0127013 A1 May 5, 2016

Related U.S. Application Data (63) Continuation of application No. 13/095,653, filed on Apr. 27, 2011, now Pat. No. 9,236,915.

(30) Foreign Application Priority Data

Apr. 27, 2010 (GB) .................................. 1007002.7
Sep. 14, 2010 (GB) .................................. 1015321.1

(51) Int. Cl.
H04B 5/00 (2006.01)

(52) U.S. Cl.
CPC .................................. H04B 5/0075 (2013.01)

(58) Field of Classification Search
None
See application file for complete search history.

(56) References Cited

U.S. PATENT DOCUMENTS

| 5,594,384 | A  | * | 1/1997  | Carroll | ................. | G06K 7/0008 |
|-----------|----|---|---------|---------|-------------------|-------------|
|           |    |   |         |         |                   | 327/58      |
| 6,304,116 | B1 | * | 10/2001 | Yoon    | ..................... | H03L 7/0812 |
|           |    |   |         |         |                   | 327/12      |
| 7,336,112 | B1 | * | 2/2008  | Sha     | ........................ | H03L 7/0812 |
|           |    |   |         |         |                   | 327/157     |

(Continued)

OTHER PUBLICATIONS

Office Action and Search Report directed toward related GB Application No. 1015321.1, UK Intellectual Property Office, Newport, South Wales, mailed Oct. 12, 2011, 3 pages.

Primary Examiner — Tuan S Tran
(74) Attorney, Agent, or Firm — Sterne, Kessler, Goldstein & Fox P.L.L.C.

(57) ABSTRACT

A near field communications (NFC) device is disclosed that detects an envelope of a radio frequency (RF) signal. The NFC device includes a peak detector that determines the envelope of the RF signal. The peak detector compares a first differential signal voltage to a second differential signal voltage. The peak detector delays a rising edge of a first differential signal and provides the first differential signal voltage to the peak detector output when the first differential signal voltage is greater than the second differential signal voltage. The peak detector delays a falling edge of a second differential signal and provides the second differential signal voltage to the peak detector output when the second differential signal voltage is greater than the first differential signal voltage.

16 Claims, 4 Drawing Sheets (56) References Cited

U.S. PATENT DOCUMENTS

| | | | |
|---|---|---|---|
| 7,986,916 B2 * | 7/2011 | Williams | G06K 7/0008 340/854.8 |
| 8,050,651 B2 | 11/2011 | Kawabata et al. | |
| 8,183,901 B2 * | 5/2012 | Lin | H03L 7/0812 327/149 |
| 8,188,787 B2 * | 5/2012 | Wilson | H03D 1/18 329/347 |
| 8,201,745 B2 | 6/2012 | Mair | |
| 8,249,500 B2 | 8/2012 | Wilson | |
| 8,305,120 B2 * | 11/2012 | Lin | H03L 7/0812 327/149 |
| 8,514,688 B2 | 8/2013 | Fujii et al. | |
| 2007/0026825 A1 | 2/2007 | Wilson | |
| 2009/0278580 A1 | 11/2009 | Kim | |
| 2011/0300799 A1 | 12/2011 | Da Fonseca et al. | |

* cited by examiner

NEAR FIELD RF COMMUNICATOR AND TIMING APPARATUS

This application claims benefit to U.S. Non-provisional application Ser. No. 13/095,653, filed on Apr. 27, 2011, which claims the benefit of Great Britain Patent Application No. 1007002.7, filed on Apr. 27, 2010 and Great Britain Patent Application No. 1015321.1, filed on Sep. 14, 2010. The contents of these applications are incorporated herein by reference.

BACKGROUND

Field of Invention

This invention relates to near field RF communicators and more particularly to methods and apparatus for detecting peaks in a received RF signal in such communicators.

Related Art

It is desirable to derive the envelope of a received RF signal in a near field RF communicator for use in demodulation of the signal. To achieve this it has been proposed to employ diode coupled transistors to provide an envelope signal from an AC voltage. However the voltage drop across transistors coupled in this way ("diode drop") means that this solution is not optimal. It has also been proposed to differentiate an AC voltage to provide an indication of the voltage extremes (minima and maxima) of the AC voltage. However this method is known to suffer from instability, particularly where noise is present on a signal. It has also been proposed to provide DSP circuits to estimate the envelope. However, typical DSP circuits require supply voltages in excess of the AC voltage to be sensed and therefore are inappropriate for use in field powered near field communicators.

The inventors in the present case have appreciated that by using zero crossing detection improved peak detection can be provided if an accurately known delay of one quarter of a cycle of the RF carrier frequency is available to the demodulator.

Prior art methods of determining clock cycle period and providing a delay based on that period are unreliable or require the application of large voltages to sweep the control voltage applied to a delay locked loop. Where power is to be derived from a received RF signal such methods of providing a delay are not appropriate.

SUMMARY

Aspects and examples of the invention are set out in the claims.

In an aspect there is provided a near field RF communicator comprising: an inductive coupler for coupling to a RF H-field to provide a RF voltage signal; a clock signal deriver coupled to receive the RF signal and to provide an initial clock signal to a delay line configured to delay the initial clock signal by a controllable delay and to output a delayed clock signal; phase matching logic configured to control the controllable delay responsive to the relationship of the phase of the delayed clock signal with respect to the phase of the initial clock signal; an edge detector coupled to the delay line to detect one or more edges in the clock signal within the delay line; wherein the phase matching logic is further responsive to the edge detector detecting an edge within the delay line. This has the advantage of providing a robust estimate of the period of the clock cycle so that peak detection can be based upon a zero crossing detection.

In one possibility the delay line comprises a plurality of delay elements and in which the edge detector is operable to detect an edge transition at or between one or more of the delay elements. This and other examples of the invention have the advantage of providing a reliable indication of whether a delay line includes one or more edge transitions.

In one possibility the phase matching logic is operable to control the delay elements so that each delay element provides a constant delay, for example the delay elements provide a voltage controlled delay and are arranged to be controlled using a single control voltage. This has the advantage that additional delay elements can be provided to give a known delay.

In one possibility the initial clock signal comprises a square wave or pulse train comprising first and second voltage levels wherein the first voltage level is lower than the second voltage level. In one possibility the edge detector is operable to detect a rising edge from the first voltage level to the second voltage level.

In one possibility the delay line comprises a main delay line and an auxiliary delay line coupled in series.

In one possibility the output of the main delay line is coupled to the phase matching logic and the output of the auxiliary delay line is arranged to controllably couple the output from the edge detector to the phase matching logic. In one possibility the phase matching logic is operable decrease the controllable delay in response to the edge detector detecting an edge in the delay line. In one possibility the phase matching logic comprises a phase and frequency detector.

In one possibility the edge detector comprises a plurality of logic gates coupled to the delay line. In one possibility the logic gates comprise a plurality of AND gates having first and second inputs, and a plurality of inverters, and in which the first input of each respective AND gate is coupled to the delay line and the second input of each respective AND gate is coupled to the delay line by a respective one of the plurality of inverters.

In one possibility the combinatorial logic comprises and OR gate having a plurality of inputs and in which the output of each respective AND gate is coupled to a corresponding input of the plurality of OR gate inputs.

In one possibility the output of the OR gate is coupled to provide a signal input to a delay flip-flop and in which the delay flip flop is clocked by a delayed clock signal provided by the delay line.

In an aspect there is provided a delay provider comprising: a delay line arranged to receive an initial clock signal and configured to delay the initial clock signal by a controllable delay and to output a delayed clock signal; phase matching logic configured to control the controllable delay responsive to the relationship of the phase of the delayed clock signal with respect to the phase of the initial clock signal; an edge detector coupled to the delay line to detect one or more edges in the clock signal within the delay line; wherein the phase matching logic is further responsive to the edge detector detecting an edge within the delay line.

In an aspect there is provided a near field RF communicator comprising:

an inductive coupler for coupling to a RF H-field to provide a RF voltage signal;

a clock signal deriver coupled to receive the RF signal and to provide an initial clock signal comprising first and second voltage levels to a delay line configured to delay the initial clock signal by a controllable delay and to output a delayed clock signal to a comparer configured to perform a comparison of the phase of the delayed clock signal with the phase of the initial clock signal; and, a level change detector coupled to the delay line to detect a change in the voltage level of the clock signal within the delay line from the first voltage level to the second voltage level;

wherein, the comparer is operable to control the controllable delay based on said comparison and on the level change detector detecting a level change of the clock signal within the delay line from the first voltage level to the second voltage level.

In an example there is provided a peripheral device comprising a near field RF communicator, for example the peripheral device may be at least one of a secure element, smart card, SIM card, display device, and an interface system.

In some examples RFID Tags and NFC Tag Emulators comprise a shunt regulator to limit the maximum voltage at the antenna pins to a safe level required by the process technology. As the process geometry scales downwards the maximum allowable voltage reduces too (e.g from 3.6 V for 0.35 μm processes to 1.98 V for 0.18 μm processes). A control circuit is generally used to perform this regulation. The peak voltage at the antenna is compared to a reference voltage and the error signal is used to control a shunt impedance across the antenna terminals. Examples of the invention have the advantage of maximising the voltage at the antenna terminals, without exceeding the maximum allowable voltage to provide the best possible dynamic range of the error signal used to demodulate data from the received RF.

Examples of the invention have the advantage of high accuracy regulation and demodulation so that the maximum available power and modulation signal is derived from the received RF signal.

Other schemes which require RC circuits may have a time constant which prevents them from responding sufficiently quickly which may result in improper demodulation and overshoots in the signal after modulation gaps in the signal. Conversely, if the time constant is too low then the true peak amplitude is not measured and the feedback signal is influenced by the waveform shape. In addition, with a fast time constant, variation in the absolute values of the feedback resistor and capacitor will also have a significant effect on the shape of the waveform at the input to the error amplifier, causing a further unwanted variation in the level of the peak voltage.

Advantageously, in examples of the invention the correct peak value is updated at every peak, i.e. twice per carrier cycle. The timed pulse produced by the comparator and or the delay elements can be used for other functions within the design, specifically demodulation functions. Here the timed pulse can be used to sample for example the voltages on the connections to the antenna with higher accuracy and less phase lag.

BRIEF DESCRIPTION OF THE DRAWINGS/FIGURES

Embodiments of the invention will now be described, by way of example only, with reference to the accompanying drawings, in which.

With reference to the drawings in general, it should be understood that any functional block diagrams are intended simply to show the functionality that exists within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hard-wired elements, software elements or firmware elements or any combination of these. The near field RF communicator may be provided wholly or partially as an integrated circuit or collection(s) of integrated circuits.

DETAILED DESCRIPTION

Figure 1:
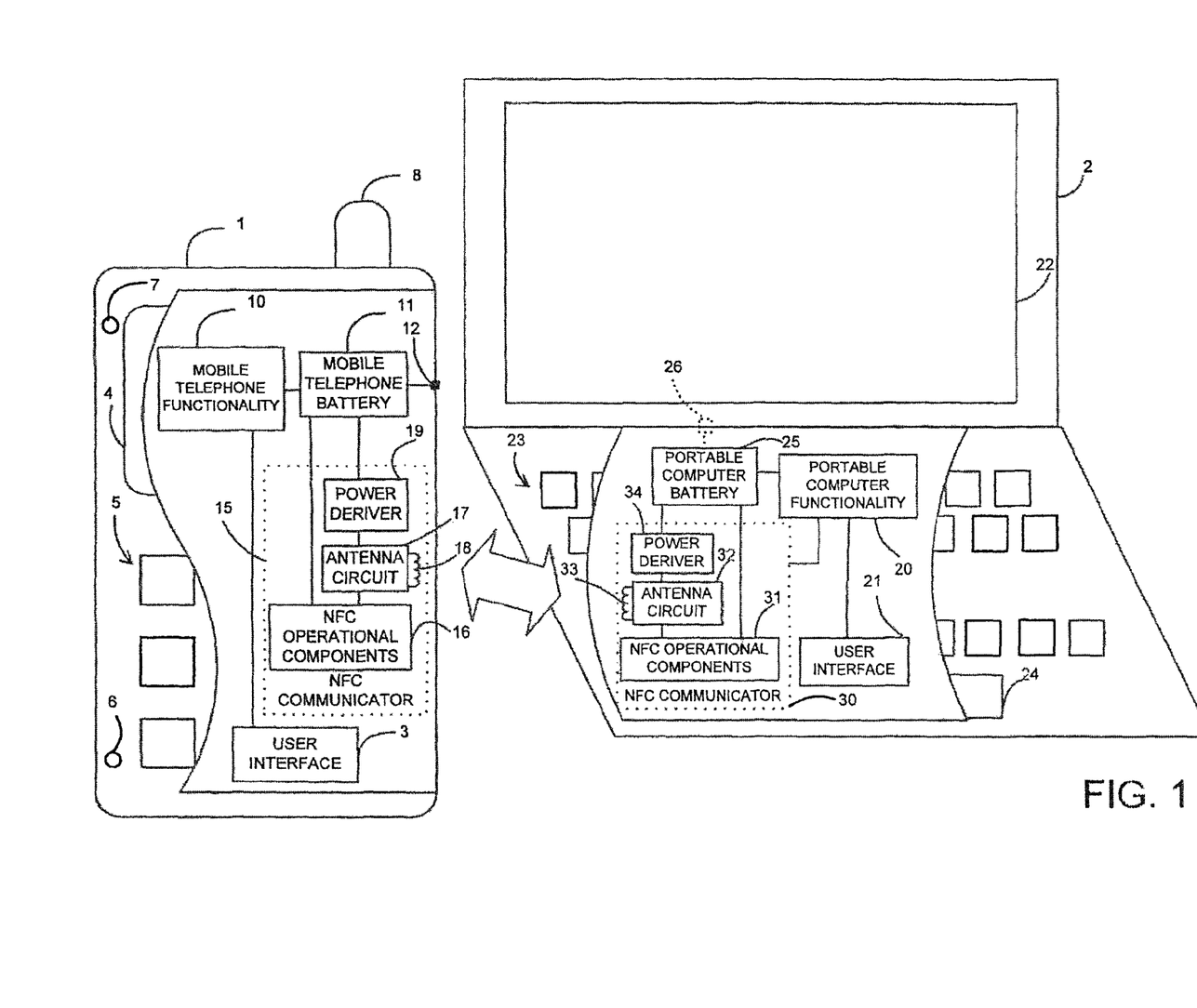
FIG. 1 shows a representational diagram illustrating communication between two devices comprising NFC communicators.

Referring now specifically to FIG. 1, there is shown a representational diagram illustrating communication between two NFC communications enabled devices. In FIG. 1 the representations of the NFC communications enabled devices have been shown partly cut-away and the functionality provided by the NFC communications enabled devices illustrated by way of a functional block diagram within the NFC communications enabled device.

As shown in FIG. 1, one NFC communications enabled device comprises a mobile telephone (cellphone) 1 and the other NFC communications enabled device comprises a portable computer 2 such as a notebook or laptop computer.

The mobile telephone 1 has the usual features of a mobile telephone including mobile telephone functionality 10 (in the form of, usually, a programmed controller, generally a processor or microprocessor with associated memory or data storage, for controlling operation of the mobile telephone in combination with a SIM card), an antenna 8 for enabling connection to a mobile telecommunications network, and a user interface 3 with a display 4, a keypad 5, a microphone 6 for receiving user voice input and a loudspeaker 7 for outputting received audio to the user. The mobile telephone also has a chargeable battery 11 coupled to a charging socket 12 via which a mains adapter (not shown) may be connected to enable charging of the battery 11. The mobile telephone 1 may have an alternative or additional power supply (not shown), for example a reserve battery or emergency battery. The chargeable battery 11 forms the primary power supply for the mobile telephone and NFC communicator 15. Given it is chargeable, it is designed to be removed at certain times.

Similarly the portable computer 2 has the usual features of a portable computer including portable computer functionality 20 in the form of, usually, a processor with associated memory in the form of ROM, RAM and/or hard disk drive, one or more removable media drives such as a floppy disk drive and/or a CDROM or DVD drive, and possibly a communications device for enabling the portable computer to connect to a network such as the Internet. The portable computer 2 also includes a user interface 21 including a display 22, a keyboard 23 and a pointing device, as shown a touchpad 24. The portable computer 2 also has a chargeable battery 25 coupled to a charging socket 26 via which a mains adapter (not shown) may be connected to enable charging of the battery 25. Again the chargeable battery 25 is the primary power supply for the portable computer and NFC communicator 30.

In addition, as shown in FIG. 1, both NFC communications enabled devices 1 and 2 have an NFC communicator 15 and 30. As shown, the NFC communicators 15 and 30 are incorporated within the larger devices and, as with the other functional blocks, may be discrete entities within the host devices or may be provided by features dispersed throughout or integrated within the host device or a part of the host device.

Each NFC communicator 15 and 30 comprises NFC operational components 16 and 31 for, as will be described below, enabling control of the NFC functionality and generation, modulation and demodulation of an RF signal. Each NFC communicator 15 and 30 also comprises an antenna circuit 17 and 32 comprising an inductor or coil in the form of an antenna 18 and 33. The antenna circuits 17 and 32 enable an alternating magnetic field (H field) generated by the antenna of one near field RF communicator 15 (or 30) by transmission of an RF signal (for example a 13.56 Mega Hertz signal) to be inductively coupled to the antenna of the other near field RF communicator 30 (or 15) when that antenna is within the near field of the RF signal generated by the one near field RF communicator 15 (or 30).

The NFC communicators 15 and 30 are coupled to the mobile telephone and portable computer functionality 10 and 20, respectively, to enable data and/or control commands to be sent between the NFC communicator and the host device and to enable user input to the NFC communicator. Communication between the user interface 3 or 21 and the NFC communicator 15 or 30 is via the host device functionality 11 or 20, respectively.

Each NFC communicator 15 and 30 also comprises a power provider 19 and 34. The power providers 19 and 34 may be power supplies within the host device or specific to the NFC communicators 15 and 30, for example a button cell battery, or other small battery. In this case as shown by dashed lines in FIG. 1, one or both of the power providers 19 and 34 comprise a coupling to derive power from the corresponding device battery 11 or 25 i.e. the primary power supply.

It will be appreciated that FIG. 1 shows only examples of types of host devices. A host device may be another type of electrical device such as a personal digital assistant (PDA), other portable electrical device such as a portable audio and/or video player such as an MP3 player, an IPOD®, CD player, DVD player or other electrical device. As another possibility the NFC communicator (15 or 3) may be comprised within or coupled to a peripheral device, for example in the form of a smart card or other secure element which may be stand alone or comprised within or intended to be inserted into another electrical device. For example a SIM card for use in a mobile telephone. As a further possibility such peripheral devices may comprise interfacing systems or protocols such as the single wire protocol.

Also, rather than being incorporated within the host device, the NFC communicator 15 or 30 may be associated with the host device, for example by a wired or wireless coupling. In such a case, a housing of the NFC communicator may be physically separate from or may be attached to the housing of the host device; in the later case, the attachment may be permanent once made or the NFC communicator may be removable. For example, the NFC communicator may be housed within: a housing attachable to another device; a housing portion, such as a fascia of the NFC communications enabled device or another device; an access card; or may have a housing shaped or configured to look like a smart card. For example an NFC communicator may be coupled to a larger device by way of a communications link such as, for example, a USB link, or may be provided as a card (for example a PCMCIA card or a card that looks like a smart card) which can be received in an appropriate slot of the larger or host device.

In addition, one or both of the NFC communications enabled devices may be a standalone NFC communicator, that is it may have no functionality beyond its NFC communications functionality.

Figure 2:
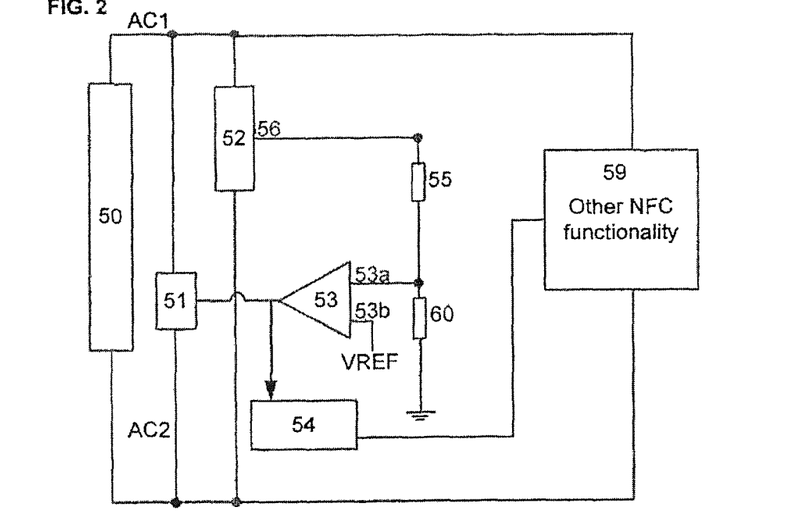
FIG. 2 shows a very schematic view of components of an NFC communicator.

FIG. 2 shows a very schematic view of components of a near field RF communicator. In the interests of clarity power supply couplings, rectification circuits and other elements of the NFC communicator are not shown. In particular, because the present invention is primarily concerned with receiver circuitry the modulation/driver circuitry has not been shown as individual components or elements but is indicated generally by element 59 which comprises NFC functionality not shown or described.

Antenna circuit 50 has first and second input/output couplings for coupling a received RF voltage, AC1 AC2, to the NFC communicator. The two antenna input/outputs are coupled to respective first and second main connections of shunt element 51 which provides a conductive path between the antenna input/outputs. Shunt element 51 has a control connection for controlling the electrical impedance of a conducting path between its first and second main connections. The control connection of shunt element 51 is coupled to the output of error amplifier 53.

Peak detector 52 is coupled in parallel with shunt element 51 across antenna inputs/outputs.

Error amplifier 53 has two inputs, one input 53b is coupled to a reference voltage VREF and the other input 53a is coupled, via resistance 60, to a ground connection and by resistance 55 to an output 56 of peak detector 52. In other words, resistances 55 and 60 are coupled in series to provide a potential divider between the peak detector output 56 and ground and amplifier input 53a is coupled to this potential divider between resistances 55 and 60.

The output of error amplifier 53 is also coupled to an input of demodulator 54.

In operation antenna 50 couples with a RF H-field produced by another near field communicator in near field range to provide an induced RF voltage AC1 AC2. Peak detector 52 provides an output voltage 56 based on the maximum voltage of AC1 and AC2 during each cycle of the RF voltage. This can be considered to represent the envelope of the received RF voltage. The peak detector output voltage 56 is scaled by potential divider 55, 60 to provide an input voltage to error amplifier 53 to control the impedance of shunt element 51.

The output of error amplifier 53 depends upon the difference between the voltages at its inputs 53a and 53b, these are VREF and a voltage representative of the peak detector output (as scaled by the potential divider 55, 60). This means that the voltage used to control the shunt element represents the difference between a reference voltage and the amplitude of the received RF signal. This voltage therefore provides a representation of modulation of the received RF signal and is coupled to the demodulator for this purpose.

To improve the accuracy of demodulation an improved peak detector is provided and described below with reference to FIG. 3a.

As will be appreciated demodulator 54 and peak detector 52 may be discrete elements or may be integrated with each other and/or with other NFC functionality (not shown).

Typically a near field RF communicator will include a rectifier to derive power from a received RF voltage and to provide a DC power supply to components of the NFC communicator and, optionally, to other functionality of a device comprising the NFC communicator. Such a rectifier may be provided separately to or as part of peak detector 52. Peak detector 52 may be provided as part of a rectifier. The antenna circuit 50 has been shown as a differential antenna however, as will be appreciated examples of the invention may be applied to single ended circuit arrangements.

Figure 3A:
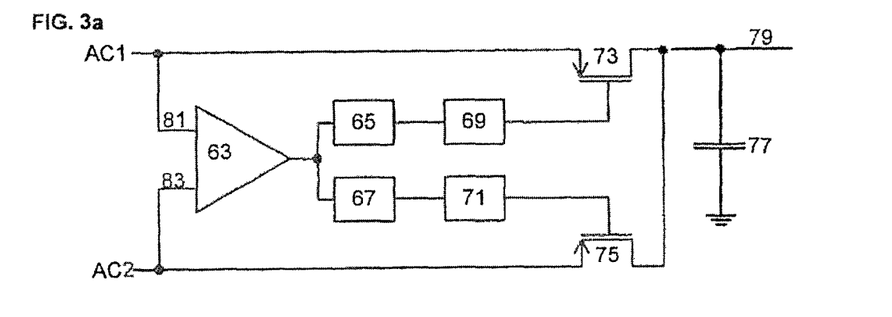
FIG. 3a shows a very schematic view of a peak detector.

FIG. 3a shows a very schematic view of a peak detector 52 in which comparator inputs 81 and 83 are arranged to receive RF signals AC1, AC2. Comparator 63 is coupled to provide a signal to two delay elements 65 and 67. Delay element 65 is coupled to pulse generator 69 which in turn is coupled to the gate connection of PMOS-FET 73. Comparator input 81 (and hence RF voltage AC1) is coupled to the source connection of PMOS-FET 73 and the drain connection of PMOS-FET 73 is coupled to peak detector output 79 (56 in FIG. 2). Delay element 67 is coupled to pulse generator 71 which in turn is coupled to the gate connection of PMOS-FET 75. The source connection of PMOS-FET 75 is coupled to comparator input 83 (and hence RF voltage AC2) and the drain connection of PMOS-FET 75 is coupled to peak detector output 79 (56 in FIG. 2). Peak detector output 79 (56 in FIG. 2) is coupled to a ground or reference voltage by capacitance 77.

The operation of the circuit of FIG. 3a will now be described in greater detail.

AC1 and AC2 are opposite voltages (i.e. AC1=−AC2). RF voltage AC1, AC2 is coupled to comparator inputs 81 and 83 such that the comparator output voltage 93 provides a square wave which changes polarity each time AC1 goes higher than AC2 and each time AC2 goes higher than AC1. Each falling edge of this square wave indicates a zero crossing of the RF voltage from a state in which AC1 is higher than AC2 to a state in which AC2 is higher than AC1. Conversely, each rising edge indicates a zero crossing of the RF voltage from a state in which AC2 is higher than AC1 to a state in which AC1 is higher than AC2.

Delay elements 67 and 65 delay the square wave produced by the comparator 63 by a delay interval based, for example, on the cycle time of the RF voltage. In response to this square wave, pulse generator 69 provides a control voltage to bias PMOS-FET 73 into a conducting state. During the periods in which PMOS-FET 73 is biased on, AC1 is coupled to charge capacitance 77. Similarly, in response to this square wave, pulse generator 71 provides a control voltage to bias FET 75 into a conducting state. The duration of these pulses of control voltage and the capacitance 77 is selected in accordance with the current drawn from AC1 and AC2 such that the peak detector output provides a satisfactory representation of the amplitude of the RF voltage with minimum ripple.

In one possibility the delay provided by delay elements 65 and 67 is based on one quarter of a cycle of the RF voltage and pulse generator 69 provides a control voltage in response to a rising edge of the delayed signal and the other pulse generator 71 provides a control voltage in response to a falling edge of the delayed signal. In this possibility a single delay element may be used in place of delay elements 69 and 71.

In one possibility the delay provided by delay element 65 is based on one quarter of a cycle and the delay provided by delay element 67 is based on three quarters of a cycle. In this possibility pulse generators 69 and 71 both provide a control voltage in response to a rising edge of the delayed signal that each receive.

In one possibility the delay is set based on the average duration of a cycle of the RF voltage and can be selected to be one quarter or three quarters of a cycle or slightly less than one quarter or three quarters of a cycle such that the RF voltage can be coupled to charge the capacitance 77 marginally before the RF voltage peak. Optionally the delay is selected so that the RF voltage is not coupled to the capacitance unless the RF voltage exceeds the voltage across the capacitance. This delay may be set by the NFC operational components (16, 31 in FIG. 1) which can be coupled to delay elements 65 and 67 and to receive the comparator output signal (although, in the interests of clarity, these couplings are not shown). In another possibility the delay may be set by other NFC functionality 59 or by the delay elements 65, 67 themselves. Whichever component performs this function the delay can be determined based on the received RF voltage, or from an internal clock deriver, or based on the output of comparator 63.

When the voltage AC1 becomes greater than AC2 the output of comparator 63 goes high. Delay element 65 delays the rising edge of this voltage before passing a signal to pulse generator 69. In response (after this delay) pulse generator 69 applies a control voltage to the gate of FET 73 to bias it into a conducting state to conductively couple voltage AC1 to the peak detector output 56 and capacitance 77 for the duration of the control voltage pulse. In a similar fashion, when the voltage AC2 becomes higher than voltage AC1, the output of comparator 63 goes low. Delay element 67 delays the falling edge of this voltage before passing a signal to pulse generator 71. In response (after this delay) pulse generator 71 applies a control voltage to the gate of FET 75 to bias it into a conducting state to conductively couple voltage AC2 to the peak detector output 56 and capacitance 77 for the duration of the control voltage pulse. The delay elements, pulse generator and PMOS-FETs are selected and arranged so that FET 73 and FET 75 are never biased into a conducting state at the same time. In the example of FIG. 3a PMOS-FETS are used because to use NMOS-FETS would require the gate voltage applied by pulse generators 69, 71 to be greater than the amplitude of the received RF voltages AC1, AC2. However, as will be appreciated, by using charge pumps and/or by making other appropriate modifications, NMOS-FETS or any other voltage controlled impedance could be used instead.

Figure 3B:
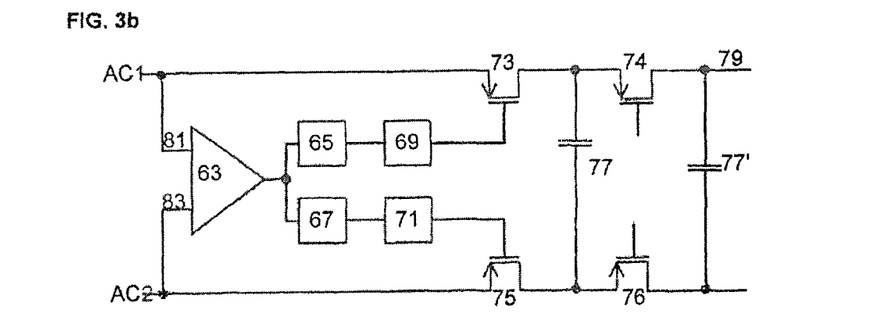
FIG. 3b shows a very schematic view of a peak detector.

FIG. 3b shows a very schematic view of an alternative peak detector 52 having a modified similar to that described above with reference to FIG. 3a and in which like reference numerals are used to indicate like elements.

As in FIG. 3a, in the example of FIG. 3b comparator inputs 81 and 83 are arranged to receive RF signals AC1, AC2. Comparator 63 is coupled to provide a signal to two delay elements 65 and 67. Delay element 65 is coupled to pulse generator 69 which in turn is coupled to the gate connection of PMOS-FET 73. Comparator input 81 (and hence RF voltage AC1) is coupled to the source connection of PMOS-FET 73. The drain connection of PMOS-FET 73 is coupled to the drain connection of PMOS-FET 75 by capacitance 77 and to the source connection of PMOS-FET 74. The gate connection of PMOS-FET 74 is coupled such that PMOS-FET 74 operates synchronously or asynchronously with PMOS-FET 73. In one possibility the gate connection of PMOS-FET 74 is coupled to the gate connection of PMOS-FET 73. In one possibility a voltage connected to the gate connection of PMOS-FET 74 is delayed with respect to the voltage connected to the gate connection of PMOS-FET 73, for example the gate connection of PMOS-FET 74 can be coupled to the gate connection of PMOS-FET 73 by a further delay element (not shown).

Delay element 67 is coupled to pulse generator 71 which in turn is coupled to the gate connection of PMOS-FET 75. The source connection of PMOS-FET 75 is coupled to comparator input 83 (and hence RF voltage AC2) and the drain connection of PMOS-PET 75 is coupled to the drain connection of PMOS-FET 73 by capacitance 77 and to the source connection of PMOS-FET 76. The gate connection of PMOS-FET 76 is coupled such that PMOS-FET 76 operates synchronously or asynchronously with PMOS-FET 75. In one possibility the gate connection of PMOS-FET 76 is coupled to the gate connection of PMOS-FET 75. In one possibility a voltage connected to the gate connection of PMOS-FET 76 is delayed with respect to the voltage connected to the gate connection of PMOS-FET 75, for example the gate connection of PMOS-FET 76 can be coupled to the gate connection of PMOS-FET 75 by a further delay element (not shown).

This modified output network of switches in series and a double capacitor has the advantage of smoothing the output of the peak detector.

As will be appreciated by the skilled practitioner in the context of the present disclosure it is advantageous to provide a delay element which can provide a delay based on a known fraction of exactly one cycle of the carrier signal.

Figure 4:
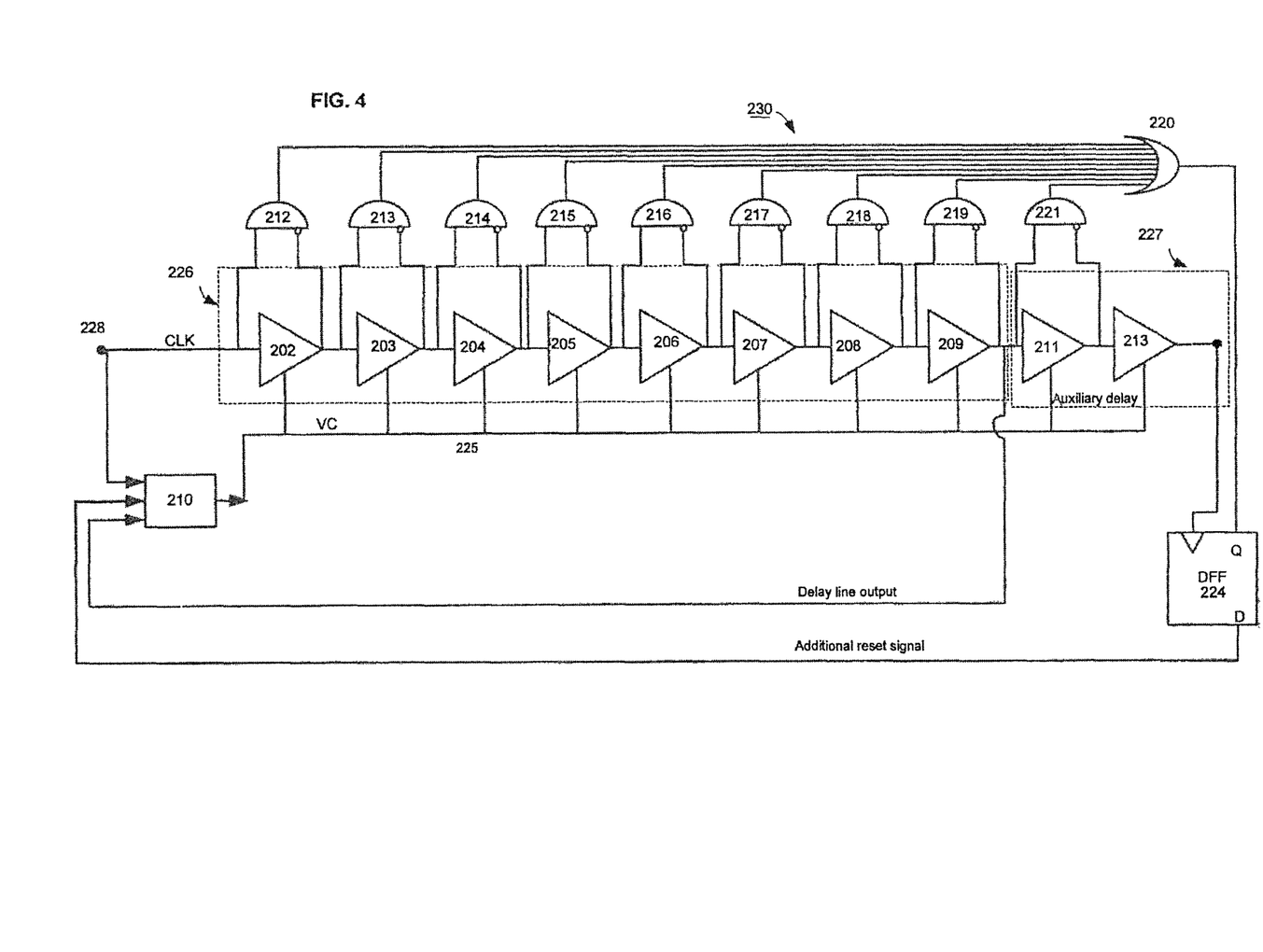
FIG. 4 shows a very schematic view of a modified delay locked loop.

As shown in FIG. 4, delay line 226 comprises, in this embodiment, voltage controlled delay elements 202, 203, 204, 205, 206, 207, 208, 209 in which each delay element comprises a signal input, a signal output and a control connection. The signal output of each delay element is coupled to the signal input of the subsequent delay element in the chain so that the delay elements are coupled together in series. The signal output of the delay element 209 that terminates the delay line provides the signal output of the delay line. The signal input of the delay element that begins the delay line provides the input of the delay line 228. An auxiliary delay line 227 comprises additional delay elements 211, 213. The control connections of all of the delay elements 202-209, 211, 213 are coupled together to provide a common control connection 225.

Combinatorial logic 230 comprises a plurality of AND gates 212-219, 221 each having first and second inputs. Coupled to each respective second input of each respective AND gate 212-219, 221 is an inverter so that each respective AND gate has an inverted input.

The output of each respective AND gate in the plurality of AND gates is coupled to a respective one of a plurality of inputs of OR gate 220. Each AND gate, 212-219, 221 is coupled across a respective one of the plurality of delay elements 202-209, 211, 213 so that the first (non-inverted) input of a AND gate 212 is coupled to the input of a corresponding delay element 202 and the second (inverted) input of that AND gate 212 is coupled to the output of that delay element 202.

Delay flip flop 224 comprises a signal input, a clock input and a signal output. The output of OR gate 220 is coupled to the signal input of a delay flip flop 224. The clock input of delay flip flop 224 is coupled to the output of the delay line. The output of the delay flip flop is coupled to a second input of a phase comparer 210.

Phase comparer 210 comprises first and second signal inputs, a reset input and a control output. The first input of the phase comparer 210 is coupled to the input of the delay line 228. The second input of the phase comparer 210 is coupled to the output of the delay flip flop 224. The control output of the phase comparer 210 is coupled to the common control connection 225 of the delay line 226.

In operation a clock signal CLK propagates through the delay line 228. A clock signal can be, for example a square wave or pulse train. The output of OR gate 220 is high if a rising edge is propagating along the delay line because, in the event that an input of one of the delay elements 202-209, 211 is high when the output of that one of the delay elements is low then the output of the AND gate 216 coupled across that delay element 206 will be high. When a rising edge exits the delay line it clocks a sample of the OR gate output through the delay flip flop 224.

In the event that the output of the OR gate 220 is high this indicates that a rising edge is present along the delay line 226 in addition to the rising edge which has clocked the delay flip flop 224. This indicates that the delay provided by the delay line 226 is longer than the clock period.

In the event that output of the OR gate is low then this indicates that no rising edge is present along the delay line apart from the rising edge which has clocked the delay flip flop 224. This indicates that the delay provided by the delay line 226 must be shorter than or equal to a single clock cycle.

The delay elements 202, 204, 206, 208 may be provided by any suitable delay element and may, for example, comprise CMOS inverters connected in series. The delay in each inverter is controlled by an input control voltage (labeled VC) applied to the control connection of the delay elements.

Phase comparer 210 is operable to compare both the phase and the frequency of two clock signal inputs. An example of a phase comparer is a phase-frequency detector. As will be appreciated by the skilled practitioner in the context of the present disclosure other types of phase comparer may be used to provide the functionality of phase comparer 210. Phase comparer 210 will now be described in more detail, by way of example only, with reference to FIG. 5.

Figure 5:
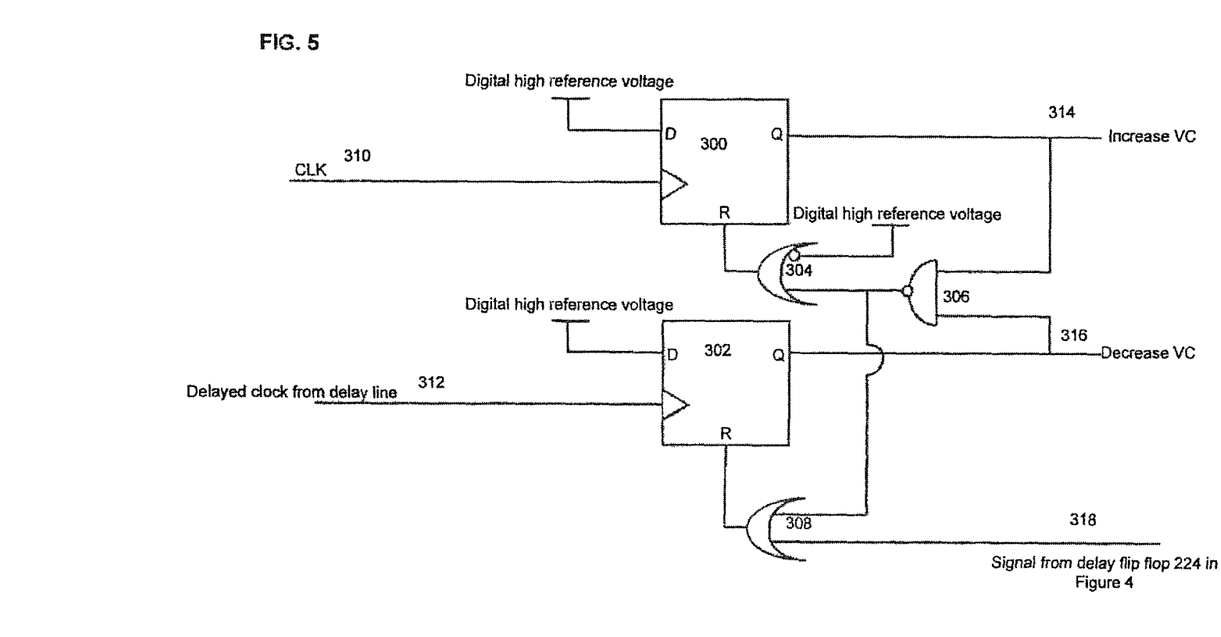
FIG. 5 shows a very schematic view of a modified phase and frequency detector for use in the delay locked loop of FIG. 4.

FIG. 5 shows phase comparer 210 which comprises first and second signal inputs 310, 312, a false lock input 318, and first and second delay flip flops 300, 302, first and second OR gates 304, 308, a NAND gate 306 and a coupling to a digital 'high' reference voltage level.

The signal input of the first delay flip flop 300 is coupled to the digital 'high' reference voltage. The clock signal input of delay flip flop 300 is coupled to the first signal input 310. The signal output of the first delay flip flop 300 is coupled to a first input of NAND gate 306.

The clock signal input of delay flip flop 302 is coupled to the second signal input 312. The signal input of the second delay flip flop 302 is coupled to the digital 'high' reference voltage. The signal output of the second delay flip flop 302 is coupled to a second input of NAND gate 306.

The output of NAND gate 306 is coupled to a first input of OR gate 308. The output of OR gate 308 is coupled to the reset input, R, of second delay flip flop 302. The second input of OR gate 308 is coupled to receive a signal from the delay flip flop 224 in FIG. 4.

The output of NAND gate 306 is also coupled to a first input of OR gate 304. The output of NAND gate 306 is coupled to a first input of OR gate 304. The output of OR gate 304 is coupled to the reset input, R, of first delay flip flop 300. The second input of OR gate 304 is coupled, via an inverter, to the digital 'high' reference voltage level.

In operation, in broad terms, the first flip-flop to be clocked produces the logic-one output, and resets the other flip-flop. When the clock edge of the second clock arrives, the second flip-flop outputs the logic one, and both flip-flops are reset. Thus, between the rising edges of the two inputs, either the signal for increasing or decreasing the control voltage is 'high'. The arrangement of OR gate 308 means that the second flip flop 302, which controls the line 316 coupled to decrease the control voltage VC in FIG. 4 can also be reset.

The lock point of the phase comparer 210 in FIG. 4 occurs when the signal provided by the delay line output is delayed by an integer number of cycles. The combinatorial logic 230 in FIG. 4 provides a reset signal if the total delay provided by the delay line 226 and the auxiliary delay 227 is greater than one cycle. This provides a margin for error which prevents the combinatorial logic from indicating a reset condition when the phase and frequency detector is correctly locked. This has the advantage of making the reset function of the combinatorial logic stable in the presence of jitter on the input clock signal.

Although phase comparer 210 has been described as a modified phase and frequency detector based on two delay flip flops this example is merely illustrative and other possibilities are contemplated. As will be appreciated by the skilled practitioner in the context of the present disclosure, any appropriate phase matching logic may be used. In addition combinatorial logic has been described as providing the functionality of detecting a rising edge along the delay line 226, 227 in FIG. 4. As will be appreciated by the skilled practitioner in the context of the present disclosure, other edge detectors may be employed.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A peak detector for a near field communications (NFC) device, the peak detector comprising:
   a delay line configured to delay a clock signal to provide a delayed clock signal;
   a phase comparer configured to provide a control signal to the delay line based on a comparison of the clock signal and the delayed clock signal, the control signal being configured to adjust a delay of the delay line based on a voltage level change of the clock signal;
   an edge detector configured to detect an edge of the clock signal as the clock signal propagates through the delay line; and
   a logic element configured to sample an output of the edge detector when the output of the delay line indicates an edge of the delayed clock signal.

2. The peak detector of claim 1, wherein the edge of the delayed clock signal comprises a rising edge.

3. The peak detector of claim 2, wherein an output of the edge detector indicates that the delay of the delay line is longer than a clock period of the clock signal.

4. The peak detector of claim 2, wherein an output of the edge detector indicates that the delay of the delay line is shorter than or equal to a clock period of the clock signal.

5. The peak detector of claim 1, wherein the phase comparer is further configured to control the plurality of delay elements to configure each delay element to delay the clock signal for an equal period.

6. A peak detector for a near field communications (NFC) device, the peak detector comprising:
   a delay line configured to delay a clock signal to provide a delayed clock signal; and
   a phase comparer configured to provide a control signal to the delay line based on a comparison of the clock signal and the delayed clock signal, the control signal being configured to adjust a delay of the delay line based on a voltage level change of the clock signal;
   an auxiliary delay line configured to provide an auxiliary delay; and
   a logic circuit configured to provide a reset signal to the phase comparer when a total delay by the delay line and the auxiliary delay is greater than one clock cycle.

7. The peak detector of claim 6, further comprising:
   an edge detector configured to detect a rising edge of the clock signal as the clock signal propagates through the delay line; and
   a logic element configured to sample an output of the edge detector based on the delayed clock signal.

8. The peak detector of claim 7, wherein the logic element is configured to sample the edge detector when the output of the delay line indicates a rising edge.

9. The peak detector of claim 8, wherein an output of the edge detector indicates that the delay of the delay line is longer than a clock period of the clock signal.

10. The peak detector of claim 8, wherein an output of the edge detector indicates that the delay of the delay line is shorter than or equal to a clock period of the clock signal.

11. The peak detector of claim 7, wherein the phase comparer is further configured to control the plurality of delay elements to configure each delay element to delay the clock signal for an equal period.

12. A peak detector for a near field communications (NFC) device, the peak detector comprising:
   a delay line configured to delay a clock signal to provide a delayed clock signal;
   a phase comparer configured to provide a control signal to the delay line based on a comparison of the clock signal and the delayed clock signal, the control signal being configured to adjust a delay of the delay line based on a voltage level change of the clock signal;
   an edge detector configured to detect a rising edge of the clock signal as the clock signal propagates through the delay line; and
   a logic element configured to sample an output of the edge detector based on the delayed clock signal.

13. The peak detector of claim 12, wherein the logic element is configured to sample the edge detector when the output of the delay line indicates a rising edge.

14. The peak detector of claim 13, wherein an output of the edge detector indicates that the delay of the delay line is longer than a clock period of the clock signal.

15. The peak detector of claim 13, wherein an output of the edge detector indicates that the delay of the delay line is shorter than or equal to a clock period of the clock signal.

16. The peak detector of claim 12, wherein the phase comparer is further configured to control the plurality of delay elements to configure each delay element to delay the clock signal for an equal period.

\* \* \* \* \*